(12) United States Patent
Batni et al.

(10) Patent No.: US 7,340,049 B2
(45) Date of Patent: Mar. 4, 2008

(54) FEEDBACK TO CALLING COMMUNICATION DEVICE ON CALL CONNECTED WITH INTELLIGENT NETWORK SIGNALING

(75) Inventors: Ramachendra P. Batni, Phoenix, AZ (US); Robert Brunetti, Munster, IN (US); John B. Reid, Naperville, IL (US); Laura Scruggs Reizner, Lisle, IL (US); Michael Joseph Rudolph, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 733 days.

(21) Appl. No.: 10/683,969

(22) Filed: Oct. 10, 2003

(65) Prior Publication Data

US 2005/0078812 A1   Apr. 14, 2005

(51) Int. Cl.
*H04M 7/00*   (2006.01)
*H04M 3/42*   (2006.01)

(52) U.S. Cl. .............................. 379/221.08; 379/207.16

(58) Field of Classification Search ........... 379/207.02, 379/207.16, 201.01–201.05, 201.12, 221.08–221.1; 455/414.1, 418, 419
See application file for complete search history.

(56) References Cited

U.S. PATENT DOCUMENTS

| 6,922,468 B1* | 7/2005 | Dammrose et al. ..... 379/221.13 |
| 2004/0120494 A1* | 6/2004 | Jiang et al. ............ 379/210.01 |
| 2005/0105706 A1* | 5/2005 | Kokkinen .............. 379/201.01 |

FOREIGN PATENT DOCUMENTS

| WO | WO 01/06679 | 1/2001 |
| WO | WO 03/071815 | 8/2003 |

* cited by examiner

*Primary Examiner*—William J. Deane, Jr.

(57) ABSTRACT

An apparatus in one example comprises one or more intelligent network platforms that serve to provide feedback to be played to a calling communication device during a call from the calling communication device for a called communication device. One or more of the one or more intelligent network platforms allow a user of the called communication device to preselect one or more portions of the feedback. One or more of the one or more intelligent network platforms employ signaling to connect the call from the calling communication device to an intelligent network platform of the one or more intelligent network platforms.

41 Claims, 2 Drawing Sheets

FEEDBACK TO CALLING COMMUNICATION DEVICE ON CALL CONNECTED WITH INTELLIGENT NETWORK SIGNALING

TECHNICAL FIELD

The invention relates generally to communications and more particularly to called party preselected feedback played to a calling party.

BACKGROUND

Ringback tone service allows a user of a mobile phone to preselect feedback to be played to a communication device that calls the mobile phone. For example, the communication device comprises a calling party and the mobile phone comprises a called party. The feedback in one example comprises an announcement and/or tone. The feedback in one example comprises a ringback tone or announcement followed by a ringback tone. The ringback tone service replaces a traditional ringing sound that a calling party hears before the called party answers the call with the ringback tone preselected by the user of the called party. The ringback tone service allows the called party to customize the ringing sound that a calling party hears upon calling the called party.

A network server in one example stores the ringback tones. The network server plays the ringback tones at the calling party. Thus, the ringback tone service does not require the ringback tone to be stored within the calling party phone. The user of the called party may access the network server to indicate a ringback tone to play for a calling party upon an incoming call from the calling party. The user of the called party may set up the ringback tone service to play specific ringback tones for specific calling parties and/or at specific times. For example, the ringback tone service allows the user of the called party to set up a happy-birthday ringback tone for a friend to be played on the birthday of the friend. Therefore, if the friend makes a call to the user of the called party on the birthday, then the friend will hear the happy-birthday ringback tone until the user of the called party answers the call.

The communication network that connects the calling party with the called party comprises a plurality of network elements. For example, the communication network comprises mobile switching centers ("MSCs") and home location registers ("HLRs"). The MSCs and the HLRs comprise modifications from the American National Standards Institute ("ANSI") standards. For example, the MSCs and the HLRs required modification from the ANSI standards to enable the ringback tone service. As one shortcoming, it may be undesirable to use non-standardized ANSI network elements to provide the ringback tone service. As another shortcoming, ANSI standardized network elements may be unable to use the ringback tone service implemented by the modified network elements.

Thus, a need exists for an enhanced implementation of a ringback tone service. A further need exists for a ringback tone service that is accomplished in accordance with the ANSI standards.

SUMMARY

The invention in one implementation encompasses an apparatus. The apparatus comprises one or more intelligent network platforms that serve to provide feedback to be played to a calling communication device during a call from the calling communication device for a called communication device. One or more of the one or more intelligent network platforms allow a user of the called communication device to preselect one or more portions of the feedback. One or more of the one or more intelligent network platforms employ signaling to connect the call from the calling communication device to an intelligent network platform of the one or more intelligent network platforms.

Another implementation of the invention encompasses a method. A user of a called communication device is allowed to preselect customized feedback for a calling communication device. Signaling is employed to route a call from the calling communication device to an intelligent network platform. The customized feedback is played at the calling communication device based on one or more characteristics of the call.

Yet another implementation of the invention encompasses an article. The article comprises one or more computer-readable signal-bearing media. The article comprises means in the one or more media for allowing a user of a called communication device to preselect customized feedback for a calling communication device. The article comprises means in the one or more media for employing signaling to route a call from the calling communication device to an intelligent network platform. The article comprises means in the one or more media for playing the customized feedback at the calling communication device based on one or more characteristics of the call.

DESCRIPTION OF THE DRAWINGS

Features of exemplary implementations of the invention will become apparent from the description, the claims, and the accompanying drawings in which:

DETAILED DESCRIPTION

Figure 1:
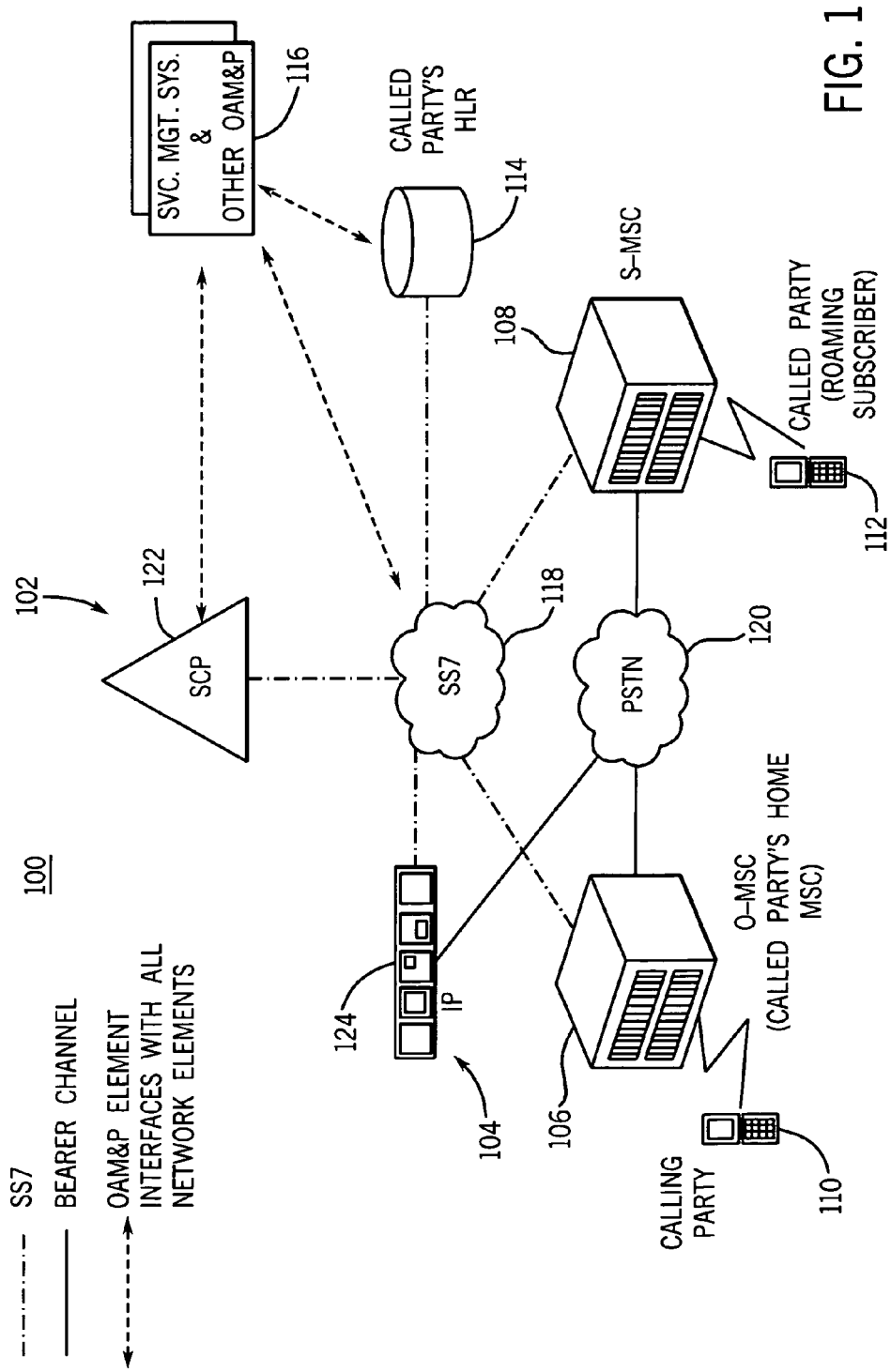
FIG. 1 is a representation of an exemplary implementation of an apparatus that comprises one or more intelligent network platforms, one or more mobile switching centers, a calling communication device, and a called communication device.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more intelligent network ("IN") platforms 102 and 104, one or more mobile switching centers ("MSCs") 106 and 108, a calling communication device 110, and a called communication device 112. In one example, the apparatus 100 further comprises a home location register ("HLR") 114 associated with the called communication device 112 and a management component 116 that provisions data for one or more of the intelligent network platforms 102 and 104, the MSCs 106 and 108, the calling communication device 110, the called communication device 112, and the home location register 114.

A signaling network 118 communicatively couples the intelligent network platforms 102 and 104, the MSCs 106 and 108, the home location register 114, and the management component 116. The signaling network 118 in one example comprises a signaling system 7 ("SS7") network that supports signaling traffic. A bearer network 120 communicatively couples the intelligent network platform 104 and the MSCs 106 and 108. The bearer network 120 in one example comprises a public switched telephone network ("PSTN") that supports bearer traffic.

The intelligent network platforms 102 and 104 comprise telephony network platforms. The intelligent network platforms 102 and 104 support intelligent network technology and standards. In one example, the intelligent network platforms 102 and 104 comprise wireless intelligent network ("WIN") platforms. In one example, the intelligent network platforms 102 and 104 comprise Customized Applications for Mobile network Enhanced Logic ("CAMEL") platforms. Exemplary embodiments of the intelligent network platforms 102 and 104 comprise one or more of a service control point ("SCP") 122 and a intelligent peripheral ("IP") 124. In another example, the MSCs 106 and 108, the home location register 114, and/or a Class 5 Central Office comprise an ability to support intelligent network signaling. The intelligent network platforms 102 and 104 may be combined into a single intelligent network platform or divided into a plurality of intelligent network platforms. The intelligent network platforms 102 and 104 serve to route calls, connect calls to communication devices, and provide feedback to be played to the calling communication device 110 during a call from the calling communication 110 device for the called communication device 112. For example, the intelligent network platforms 102 and 104 serve to enable a ringback tone service. The intelligent network platforms 102 and 104 allow a user of the called communication device 112 to preselect one or more portions of the feedback. The user of the called communication device 112 may customize the feedback. For example, the user preselects a ringback tone to be played in the feedback at the calling communication device 110.

In one example, the SCP 122 comprises service logic, American National Standards Institute ("ANSI-41") message handling logic, WIN message handling logic, and an SS7 interface. In another example, the SCP 122 comprises service logic, Global System for Mobile communications ("GSM") message handling logic, and Customized Applications for Mobile network Enhanced Logic message handling logic, and the SS7 interface. The SCP 122 in one example comprises a call controller and a data server. In one example, the call controller and the data server reside on a single SCP. In another example, the call controller and the data server reside on different SCPs. If the call controller and the data server reside on different SCPs, then the call controller queries the data server on the separate SCP for subscriber profile information and to determine what ringback tone to play at the calling communication device 110. The SCP 122 in one example provides instruction to the IP 124 to control the functionality of the IP 124. For example, the SCP 122 sends messages to the IP 124 to alert the IP 124 to play the customized feedback at the calling communication device 110.

The SCP 122 in one example employs one or more of WIN, CAMEL, ANSI Capability Set 1 ("CS-1"), International Telecommunication Union ("ITU-T") CS-1, and session initiation protocol ("SIP") signaling to route calls that require the ringback tone service to the IP 124. An exemplary employment of WIN signaling is illustrated herein. For example, the SCP 122 receives WIN signaling relating to an incoming call at the MSC 106 to the called communication device 112 and sets parameters in WIN signaling messages to direct the incoming call to the IP 124. Therefore, the IP 124 can play the preselected ringback tone to the calling communication device 110. For example, the SCP 122 routes the incoming call to the IP 124, so the IP 124 may play the preselected feedback at the calling communication device 110 prior to connection of the call with the called communication device 112. To route the incoming call to the IP 124, the SCP 122 in one example sets a TerminationList parameter of a WIN signaling message to a directory number of the IP 124. Then, the SCP 122 sends the TerminationList parameter in the WIN signaling message to the MSC 106 that queried the SCP 122 on what action to take for the incoming call.

In one example, the SCP 122 determines that one or more characteristics of the incoming call match one or more ringback tone service criteria set up by the user of the called communication device 112, then the SCP 122 routes the incoming call to the IP 124. For example, the user of the called communication device 112 may instruct the SCP 122 to invoke the ringback tone service upon occurrence of an incoming call from a certain calling communication device, an incoming call at a certain time of day, an incoming call on a certain day of the week, an incoming call on any other special day of the year, or certain call progress events. In another example, the one or more characteristics of the incoming call do not match the one or more ringback tone service criteria, then the incoming call may trigger a presentation of a menu at the called communication device 112 that allows the user of the called communication device 112 to set up ringback tone service criteria for subsequent calls from the calling communication device 110. The menu in one example comprises a Interactive Voice Response ("IVR") or Wireless Application Protocol ("WAP") menu.

If the incoming call matches the ringback tone service criteria, then the IP 124 plays customized feedback at the calling communication device 110. In one example, the IP 124 stores the customized feedback, such as the ringback tones. In another example, the IP 124 accesses a storage component that maintains the customized feedback.

The IP 124 individually connects call legs with the calling communication device 110 and the called communication device 112 to communicatively couple the calling communication device 110 with the called communication device 112. For example, the IP 124 receives an incoming call leg from the calling communication device 110. The IP 124 connects with the incoming call leg to establish communication with the calling communication device 110. Then, the IP 124 initiates an outgoing call leg to the called communication device 112 to establish communication with the called communication device 112. To connect the calling communication device 110 with the called communication device 112, the IP 124 bridges the incoming call leg with the outgoing call leg. For example, the IP 124 hairpins the incoming call leg with the outgoing call leg.

The MSCs 106 and 108 support mobile telecommunication devices, for example, the communication devices 110 and 112. The MSCs 106 and 108 in one example comprise an originating mobile switching center ("O-MSC") 106 and a serving mobile switching center ("S-MSC") 108. For example, the O-MSC 106 supports a home area of the called communication device 112 and the S-MSC 108 supports the called communication device 112 if the called communication device 112 moves to a roaming area. If the called communication device 112 is within the home area supported by the O-MSC 106, then the S-MSC 108 may not be in the call path between the calling communication device 110 and the called communication device 112. For example, in this case, the O-MSC 106 also serves as a S-MSC for the called communication device 112.

The management component 116 maintains and administers the network components. For example, the management component 116 provides Operations, Administration, Maintenance & Provisioning ("OAM&P") functionality to the network. Each of the network components in one example comprise and interface with the management component 116. The management component 116 provisions a subscriber profile for the called communication device 112. The SCP 122 in one example accesses the subscriber profile during connection of the call and to gather information for the ringback tone service. The management component 116 also provisions ringback tones at the IP 124 and subscriber profile data at the home location register 114 such that the O-MSC 106 sends WIN signaling messages to the SCP 122 when it receives an incoming call for the called communication device 112.

The intelligent network platforms 102 and 104 in one example employ WIN signaling, Integrated Services Digital Network User Part ("ISUP") signaling, and ANSI-41 signaling to enable the ringback tone service. The WIN signaling, ISUP signaling, and ANSI-41 signaling are in accordance with ANSI-41 standards. In one exemplary implementation, the signaling messages follow one or more of ANSI/TIA/EIA-41-D, TIA/EIA/IS-771, and TIA/ELA/IS-826 standards. Since the SCP 122 employs standard based WIN signaling to route the call from the calling communication device 110 to the IP 124, then other network components may be standards based network components. For example, the MSCs 106 and 108 and the HLR 114 comprise standards based network components. Therefore, the MSCs 106 and 108 and the HLR 114 do not require modifications to enable the ringback tone service.

The ringback tone service allows the user of the called communication device 112 to preselect feedback to be played to the calling communication device 110 upon occurrence of one or more events. In one example, the feedback comprises a preselected ringback tone. Thus, upon a call to the called communication device 112 from the calling communication device 110, the IP 124 replaces a traditional ringing sound that the user of the calling communication device 110 hears before the called communication device 112 answers with the ringback tone preselected by the user of the called communication device 112. The ringback tone service allows the user of the called communication device 112 to customize the ringing sound that the calling communication device 110 hears upon calling the called communication device 112. The ringback tone service may also play an announcement and the preselected ringback tone. For example, the IP 124 plays the announcement followed by the ringback tone to the calling communication device 110.

In another example, the feedback comprises a call progress indication. The intelligent network platforms 102 and 104 allow the user of the called communication device 112 to customize the call progress indications that the calling communication device 110 hears upon occurrence of call progress events. For example, the IP 124 plays a customized announcement for the user of the calling communication device 110 in response to a busy signal, non-answer signal, or routing failure indication.

The IP 124 plays the ringback tone at the calling communication device 110 between receipt of the call from the calling communication device 110 and answer of the call by the called communication device 112. In one example, the IP 124 begins playing the ringback tone for the calling communication device 110 substantially at a same time as beginning the alerting of the calling communication device. In another example, the IP 124 adds a lag time between start of the ringback tone for the calling communication device 110 and the start of alerting for the called communication device 112. For example, the user of the called communication device 112 may set the lag time to allow the ringback tone to play at the calling communication device 110 for a period before alerting the called communication device 112. The lag time promotes an increase in the length of the ringback tone heard by the user of the calling communication device 110. The lag time in one example is reduced based on a number of times the user of the calling communication device 110 has heard the ringback tone. For example, if the calling communication device 110 has yet to hear the ringback tone, then the lag time is longer. Subsequent calls between the calling communication device 110 and the called communication device 112 may have shorter lag times or no lag time at all.

The IP 124 in one example facilitates a redirection service in addition to the ringback tone service. For example, an incoming call leg indicates a telephone number of an intended recipient of the call dialed by a user of the calling communication device 110. However, if a redirection request exists that is associated with the telephone number, then the IP 124 may initiate the outgoing call leg to a different telephone number than the dialed telephone number. Upon detection of the redirection request, the IP 124 may substitute a telephone number of another communication device (e.g., the called communication device 112) for the telephone number dialed by the user of the calling communication device 110. The IP 124 places the telephone number of the called communication device 112 in the outgoing call leg to connect the calling communication device 110 with the called communication device 112. The IP 124 may prefix, postfix, insert, delete, and/or substitute the called party digits received from the incoming call leg when placing the outgoing call leg.

Figure 2:
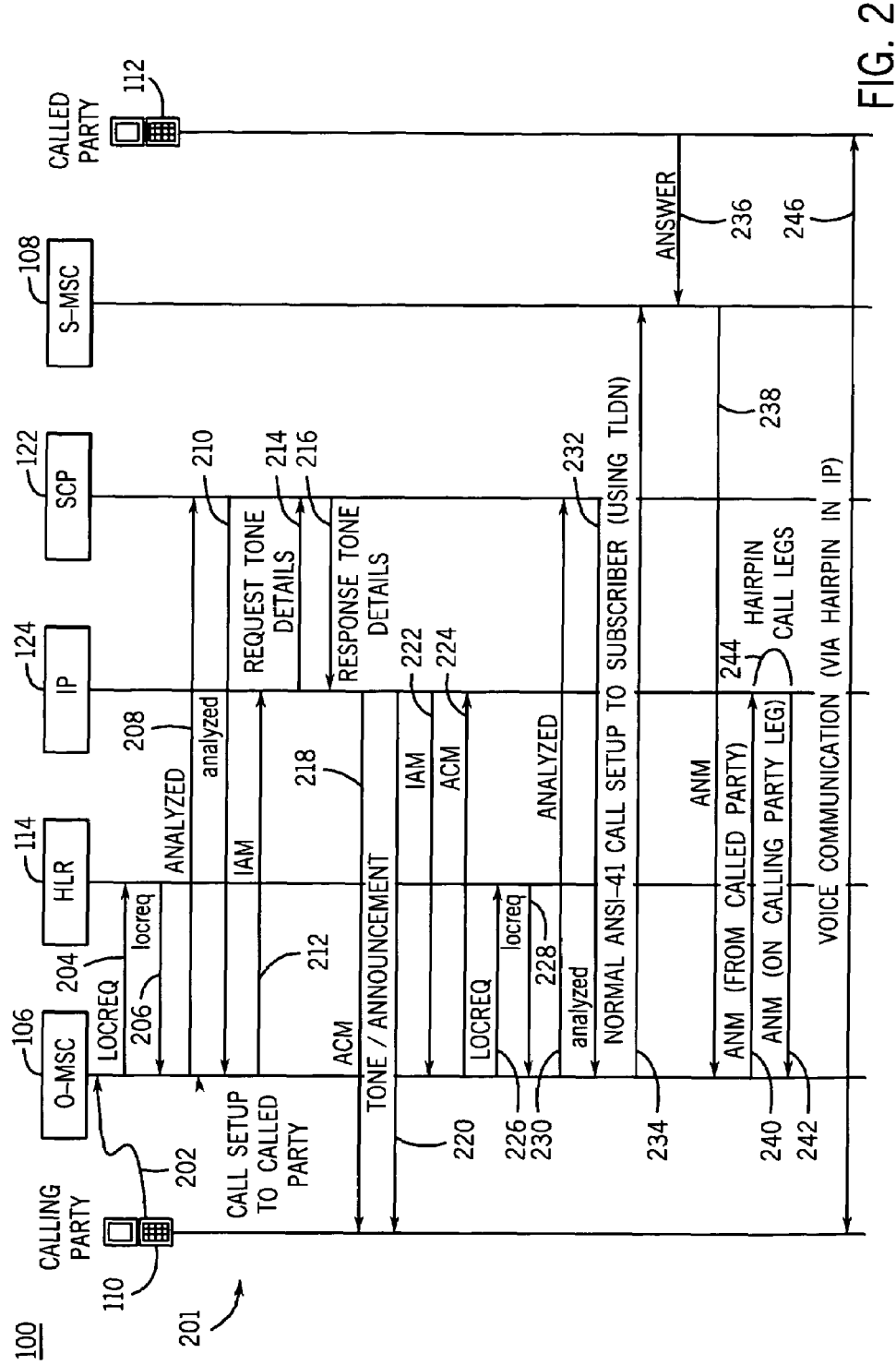
FIG. 2 is a representation of one exemplary message flow for a delivery to the calling communication device of feedback preselected by a user of the called communication device of the apparatus of FIG. 1.

Turning to FIG. 2, an illustrative description of one exemplary operation of the apparatus 100 is now presented, for explanatory purposes. A message flow 201 represents an exemplary connection of the calling communication device 110 with the called communication device 112 through exemplary employment of WIN signaling. The message flow 201 also represents exemplary a delivery to the calling communication device 110 of feedback preselected by the user of the called communication device 112. A user of the called communication device 112 in one example subscribes to the feedback service (e.g., the ringback tone service or call progress indication service) to preselect customized feedback (e.g., customized ringback tones or customized call progress indications) for the calling communication device 110. The message flow 201 in one example illustrates the ringback tone service. The user of the called communication device 112 in one example has configured and activated the ringback tone service prior to the initiation of the message flow 201. For example, the user of the called communication device 112 has preselected one or more ringback tones for incoming calls that meet one or more criteria.

To initiate a call to the called communication device 112, the user of the calling communication device 110 dials the telephone number of the called communication device 112 resulting in a call setup message 202 being received at the O-MSC 106. The call setup message 202 indicates that the call is for the called communication device 112. Per normal ANSI-41 operation, the call processing logic in O-MSC 106 encounters a Mobile_Termination trigger when processing the call to the called communication device 112. Upon encountering the Mobile_Termination trigger, the O-MSC 106 sends a LOCREQ message 204 to the HLR 114 associated with the called communication device 112. Prior to receipt of the LOCREQ message 204, the HLR 114 has been provisioned to return appropriate triggers and address information to the O-MSC 106 based on the characteristics of the call. In another example, where the calling communication device 110 comprises a landline telephone, the Central Office switches that support the calling communication device 110 are provisioned to return triggers and address information to the O-MSC 106 based on the characteristics of the call.

The LOCREQ message 204 comprises a location request invoke message to determine the current location of the called communication device 112. The LOCREQ message 204 employs WIN signaling. For example, the LOCREQ message 204 comprises an ANSI-41 message with WIN signaling enhancements. The O-MSC 106 sets a TRANSCAP parameter of the LOCREQ message 204 to indicate that the O-MSC 106 is able to process the TRIGADDRLIST parameter. The O-MSC 106 sets a WINCAP parameter to indicate the triggers that are supported by the O-MSC 106. The O-MSC 106 sets a TRIGTYPE parameter to indicate that the Mobile_Termination trigger has been encountered.

The HLR returns a locreq message 206 to the O-MSC 106. The locreq message 206 comprises a location request return result message. The locreq message 206 employs WIN signaling. For example, the locreq message 206 comprises an ANSI-41 message with WIN signaling enhancements. The HLR 114 sets a TRIGADDRLIST parameter in the locreq message 206 to indicate the Advanced_Termination and Location triggers are armed. For example, the HLR 114 has been provisioned to set the triggers based on the characteristics of the call. Other triggers may be armed based on other services subscribed to by the user of the called communication device 112, such as an Initial_Termination trigger and/or a Called_Routing_Address_Available trigger for prepaid subscribers.

Upon receipt of the locreq message 206, the O-MSC 106 continues the ANSI call processing and encounters the Advanced_Termination trigger and determines from the TRIGADDRLIST parameter to send an ANLYZD message 208 to the SCP 122. The TRIGADDRLIST parameter of the locreq message 206 comprises an indication of the SCP 122. The ANLYZD message 208 comprises a WIN signaling message, for example, an Analyzed Information operation message.

The SCP 122, using the subscriber's profile stored in the data server, determines that the recipient of the call (i.e., the called communication device 112) subscribes to the ringback tone service, the service is active at this instance, and a customized ringback tone is to be played to the calling communication device 110. The SCP 122 employs one or more characteristics of the call to determine the ringback tone. For example, the SCP 122 employs one or more of an identification of the calling communication device 110, an identification of the called communication device 112, time of day of the call, and day of week of the call. Once the SCP 122 determines the ringback tone based on the one or more characteristics of the call, it sends an anlyzd message 210 to the O-MSC 106. The anlyzd message 210 comprises a WIN signaling message, for example, an Analyzed Information response message. The SCP 122 sets the TerminationList parameter in the anlyzd message 210 to a directory number of the IP 124 that provides the ringback tone service for the called communication device 112. The SCP 122 also sets a RedirectingNumberDigits parameter in the anlyzd message 210 to the directory number (e.g., telephone number) of the called communication device 112. Also, the SCP 122 sets a DMH_SVCID parameter in the anlyzd message 210 to indicate to the O-MSC 106 that the ringback tone service has been invoked.

Upon receipt of the anlyzd message 210, the O-MSC 106 sends an IAM message 212 to the IP 124. The IAM message 212 comprises an ISUP message. The LAM message 212 serves to extend the call to the IP 124. The O-MSC 106 sets a RedirectingNumberDigits parameter in the IAM message 212 to the RedirectingNumberDigits received from the anlyzd message 210.

The IP 124 processes the IAM message 212. Thus, the IP 124 sends a tone request message 214 to the SCP 122. The IP 124 queries the SCP 122 with information received from the LAM message 212. The tone request message 214 requests the ringback tone that is to be played to the calling communication device 110. The tone request message 214 in one example comprises a transfer control protocol/internet protocol ("TCP/IP") or lightweight directory access protocol ("LDAP") message.

In one example, the SCP 122 and the IP 124 comprise separate intelligent network platforms. In another example, the SCP 122 and the IP 124 comprise portions of a single intelligent network platform. For example, the functionality of both the SCP 122 and the IP 124 may be combined into one or more intelligent network platforms. If the SCP 122 and the IP 124 are combined into one intelligent network platform, then messages between the SCP 122 and the IP 124 (e.g., the tone request message 214) become internal operations of the one intelligent network platform. For example, small applications may employ the one intelligent network platform for the functionality of both the SCP 122 and the IP 124.

Upon receipt of the tone request message 214, the SCP 122 sends a tone response message 216 to the IP 124. The tone response message 216 indicates what customized tone is to be played by the IP 124 to the calling communication device 110. Upon receipt of the tone response message 216, the IP 124 sends an ACM message 218 to the O-MSC 106. The ACM message 218 provides voice path cut-thru to the calling communication device 110. After transmission of the ACM message 218, the IP 124 plays the appropriate ringback tone 220 at the calling communication device 110. For example, the IP 124 connects the appropriate ringback tone 220 to the calling communication device 110 on a first leg of the call. The first leg of the call connects the calling communication device 110 with the IP 124.

To establish a connection with the called communication device 112, the IP 124 initiates a second call leg of the call to the called communication device 112. For example, the IP 124 initiates a new call to the called communication device 112. Thus, the IP 124 sends an IAM message 222 to the O-MSC 106. The IAM message 222 comprises an ISUP message. The IP 124 sets the CallingPartyNumber parameter to the telephone number of the calling communication device 110 and the RedirectingNumber parameter to a unique directory number that identifies the IP 124. By setting the parameters in this way, the IP 124 ensures that the identity of the calling communication device 110 is correctly displayed to the called communication device 112 when the called communication device 112 is rung, if the called communication device 112 subscribes to any service such as calling name or calling number display. Upon receipt of the IAM message 222, the O-MSC 106 responds with an ACM message 224 to the IP 124. The ACM message 224 comprises an ISUP message.

Per normal ANSI-41 operation, call processing logic in O-MSC 106 encounters a Mobile_Termination trigger when processing the call to the called communication device 112 invoked by the IAM message 222. Upon encountering the Mobile_Termination trigger, the O-MSC 106 sends a LOCREQ message 226 to the HLR 114 that is associated with the called communication device 112. The O-MSC 106 sets a TRANSCAP parameter of the LOCREQ message 204 to indicate that the O-MSC 106 is able to process the TRIGADDRLIST parameter. The O-MSC 106 sets a WINCAP parameter to indicate the triggers that are supported by the O-MSC 106. The O-MSC 106 sets a TRIGTYPE parameter to indicate that the Mobile_Termination trigger has been encountered. Upon receipt of the LOCREQ message 226, the HLR 114 sends a locreq message 228 to the O-MSC 106. The locreq message 228 is substantially similar to the locreq message 206. The LOCREQ message 226 and the locreq message 228 comprise ANSI-41 messages with WIN signaling enhancements.

Upon receiving the locreq message 228, the O-MSC 106 continues the ANSI call processing and encounters the Advanced_Termination trigger and sends an ANLYZD message 230 to the SCP 122 indicated in the TRIGADDRLIST parameter of the locreq message 228. The ANLYZD message 230 comprises a WIN signaling message, for example, an Analyzed Information operation message. The O-MSC sets the parameters of the ANLYZD message 230 based on the information received from the IAM message 222. For example, the O-MSC 106 sets the Digits (Dialed) parameter to the directory number (e.g., phone number) of the called communication device 112, the CallingPartyNumberDigits1 parameter to the directory number (e.g., phone number) of the calling communication device 110, and the RedirectingNumberDigits to the unique directory number of the IP 124.

The SCP 122 determines that the recipient of the call (i.e., the called communication device 112) subscribes to the ringback tone service. Thus, the SCP 122 sends an anlyzd message 232 to the O-MSC 106. The SCP 122 employs the RedirectingNumberDigits parameter of the ANLYZD message 230 to determine that the call originated from the IP 124. Thus, the SCP 122 sends an anlyzd message 232 to the O-MSC 106 to initiate normal call completion treatment for the call. The anlyzd message 232 in one example is empty, for example, the SCP 122 does not activate triggers to initiate special routing of the call. The anlyzd message 232 comprises a WIN signaling message, for example, an Analyzed Information response message.

Upon receipt of the analyzed message 232, the O-MSC 106 proceeds with normal ANSI-41 call setup 234 to connect the call to the called communication device 112. In one example, the called communication device 112 is located in a home area and is served by the O-MSC 106. Therefore, the O-MSC 106 pages the called communication device 112 to send an indication to the calling communication device 110 of the incoming call.

In another example, the called communication device 112 is roaming and is located in an area served by the S-MSC 108. Therefore, the O-MSC 106 passes the call to the S-MSC 108 for delivery to the called communication device 112, as illustrated as the normal ANSI-41 call setup 234 in the message flow 201. For example, the O-MSC 106 detects the Location trigger and sends a LOCREQ message to the HLR 114. The O-MSC 106 sets the TRIGTYPE parameter to indicate the Location trigger was encountered. The HLR 114 determines that call processing shall continue and sends a ROUTREQ message to a visitor location register ("VLR"). The ROUTREQ message comprises a routing request message. The VLR forwards the ROUTREQ message to the S-MSC 108. The S-MSC allocates a Temporary Local Directory Number ("TLDN") for the call and returns the TLDN to the VLR in a routreq message. The routreq message comprises a routing request response message. The VLR forwards the routreq message to the HLR 114. The HLR 114 sends the locreq message to the O-MSC 106 with instructions to set up the call to the called communication device 112. Then, the O-MSC 106 sets up the call to the called communication device 112.

The message flow 201 illustrates one example where the called communication device 112 is a postpaid subscriber and thus, the HLR 114 does not arm the Called_Routing_Address_Available trigger. If the called communication device 112 is a prepaid subscriber then Steps. L and M of Sec. 8.X.22, TIA/ELI/IS-826 are executed prior to delivery of the call to the called communication device 112.

To deliver the call to the called communication device 112, the S-MSC 108 pages the called communication device 112 to cause ringing at the called communication device 112. Upon answer by the user of the called communication device 112, the called communication device 112 sends an answer message 236 to the S-MSC 108. Upon receipt of the answer message 236, the S-MSC 108 sends an ANM message 238 to the O-MSC 106.

The O-MSC 106 sends an ANM message 240 to the IP 124 to connect the call with the IP 124. The IP 124 recognizes the ANM message 240 from the second call leg and ceases the playing of the ringback tone at the calling communication device 110. The IP 124 sends an ANM message 242 to the O-MSC 106 on the first call leg. The IP 124 is connected with the calling communication device 110 on the first call leg of the call. Also, the IP 124 is connected with the called communication device 112 on the second call leg. Thus, to communicatively couple the calling communication device 110 with the called communication device 112, the IP 124 bridges the first call leg with the second call leg. For example, the IP 124 connects the first call leg and the second call leg with a hairpin.

Once the IP 124 hairpins the first call leg with the second call leg, voice communication 246 between the calling communication device 110 and the called communication device 112 may ensue. In one example, the hairpin remains in the call path in the IP 124 between the calling communication device 110 and the called communication device 112 for the duration of the call. In another example, the IP 124 employs a call drop-back command to transfer the call bridge to the MSC 106. For example, the IP 124 indicates the two ports of the call to the MSC 106 and instructs the MSC 106 to bridge the two ports together. Thus, the IP 124 drops out of the call path and the MSC 106 bridges the first call leg with the second call leg.

The message flow 201 illustrates an exemplary connection of the call between the calling communication device 110 and the called communication device 112. However, the IP 124 in one example may play the customized feedback (e.g., the preselected ringback tone) at the calling communication device 110 without ever connecting the call to the called communication device 112. For example, based on one or more characteristics of the call, the IP 124 may play an announcement to the calling communication device 110 without connecting the call. The incoming call to the IP 124 is designated for delivery to the called communication device 112. However, the IP may play the customized feedback to the calling communication device 110 after connection of the first call leg with or without connection of the second call leg.

In one example, the called communication device 112 may not want to receive calls at a preselected time from a preselected group of calling communication devices. Thus, the called communication device 112 may preselect a ringback tone to play at the calling communication device 110, upon an incoming call from the calling communication device 110 during the preselected time. If the call meets one or more non-delivery criteria, then the IP 124 does not initiate the second call leg to the called communication device 112. The IP 124 in one example plays the announcement to the calling communication device 110 until the calling communication device 110 disconnects or until a timeout is reached. The IP 124 in one example sends an answer message back to the calling communication device 110 to generate a billing record for the call.

The apparatus 100 in one example employs one or more computer-readable signal-bearing media. One example of a computer-readable signal-bearing medium for the apparatus 100 comprises one or more instances of the recordable data storage medium of one or more of the intelligent network platforms 102 and 104. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. It will be apparent to those skilled in the relevant art that similar functionality can be achieved using other protocols, such as Global System for Mobile communications ("GSM")/Customized Applications for Mobile network Enhanced Logic ("CAMEL"), ANSI Capability Set 1 ("CS-1"), International telecommunication union ("ITU-T") CS-1, and session initiation protocol ("SIP"), by variations of the steps and operations without departing from the spirit of the invention. For instance, the steps may be performed in a differing order, with similar operations, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    at least one intelligent network platform that serves to provide feedback to be played to a calling communication device during a call from the calling communication device for a called communication device;
    wherein one of the at least one intelligent network platform allows a user of the called communication device to preselect one or more portions of the feedback;
    wherein the at least one intelligent network platform comprises a service control point and an intelligent peripheral that are configured to communicate with a standards based mobile switching center;
    wherein the service control receives a first message from the standards based mobile switching center for a first call leg of the call and employs signaling to cause the standards based mobile switching center to connect the first call leg to the intelligent peripheral;
    wherein the intelligent peripheral provides the feedback to the calling communication device through the first call leg and initiates a second call leg to the called communication device through the standards based mobile switching center to connect with the called communication device;
    wherein the service control point receives a second message from the standards based mobile switching center for the second call leg and employs signaling to cause the standards based mobile switching center to connect the second call leg to the called mobile communication device.

2. The apparatus of claim 1, wherein the intelligent peripheral employs a call drop-back command to transfer control of the first call leg and the second call leg from the intelligent peripheral to a switching center.

3. The apparatus of claim 1, wherein the intelligent peripheral connects a call bridge or hairpin between the first call leg and the second call leg to connect the calling communication device with the called communication device.

4. The apparatus of claim 3, wherein upon detection of a need to bridge the first and second call legs, the intelligent peripheral employs a call drop-back command to direct the standards based mobile switching center to support the first and second call legs.

5. The apparatus of claim 1, wherein the one or more portions of the feedback comprise a ringback tone preselected by the user of the called communication device;
    wherein the intelligent peripheral plays the ringback tone to the calling communication device.

6. The apparatus of claim 5, wherein the intelligent peripheral plays the ringback tone at the calling communication device between receipt of the call from the calling communication device and answer of the call by the called communication device.

7. The apparatus of claim 5, wherein the one or more of the at least one intelligent network platform that allows a user of the called communication device to preselect the ringback tone allow the user to customize the ringback tone for the call from the calling communication device.

8. The apparatus of claim 7, wherein the call from the calling communication device comprises a first call from a first calling communication device, wherein the ringback tone comprises a first ringback tone;
    wherein the one or more of the at least one intelligent network platform that allows a user of the called communication device to preselect the first ringback tone allow the user to customize a second ringback tone for a second call to be played to a second calling communication device;
    wherein the second ringback tone is different than the first ringback tone.

9. The apparatus of claim 1, wherein the one or more portions of the feedback comprise a customized call progress indication preselected by the user of the called communication device;
    wherein the intelligent peripheral plays the call progress indication at the calling communication device upon occurrence of an event associated with the call progress indication.

10. The apparatus of claim 1, wherein the intelligent peripheral and the service control point are implemented within a same intelligent network platform.

11. The apparatus of claim 1,
wherein the service control point associates the first and second call legs based on a RedirectingNumberDigits parameter from the standards based mobile switching center.

12. The apparatus of claim 11, wherein the service control point determines that the call requires the one or more portions of the feedback that are preselected by the user of the called communication device, wherein the service control point instructs the switching center to connect with the intelligent peripheral on the first call leg;
wherein the intelligent peripheral queries the service control point for the one or more portions of the feedback to be played to the calling communication device;
wherein the service control point determines the one or more portions of the feedback based on one or more characteristics associated with the call, wherein the service control point indicates the one or more portions of the feedback to the intelligent peripheral;
wherein the intelligent peripheral plays the one or more portions of the feedback at the calling communication device;
wherein the intelligent peripheral initiates the second call leg to the called communication device.

13. The apparatus of claim 1, wherein the first call leg comprises an indication of a telephone number dialed by a user of the calling communication device;
wherein upon detection of redirection request associated with the telephone number, the intelligent peripheral substitutes a telephone number of the called communication device for the telephone number dialed by the user of the calling communication device in the second call leg to connect the calling communication device with the called communication device.

14. The apparatus of claim 1, wherein the signaling comprises wireless intelligent network signaling, wherein the one or more intelligent network platforms employ the wireless intelligent network signaling and one or more of American National Standards Institute ("ANSI") and Integrated Services Digital Network User Part ("ISUP") messages to play the feedback at the calling communication device and connect the calling communication device with the called communication;
wherein the one or more intelligent network platforms employ the signaling in accordance with ANSI standards.

15. The apparatus of claim 1, wherein the signaling comprises International Telecommunication Union ("ITU-T") signaling, wherein the one or more intelligent network platforms employ the ITU-T signaling to play the feedback at the calling communication device and connect the calling communication device with the called communication;
wherein the one or more intelligent network platforms employ the ITU-T signaling in accordance with International Telecommunication Union ("ITU-T") standards.

16. The apparatus of claim 1, wherein the signaling comprises one or more of intelligent network triggers and intelligent network trigger address lists;
wherein the one or more intelligent network platforms set the one or more of intelligent network triggers and intelligent network trigger address lists to route the call.

17. The apparatus of claim 1, wherein the intelligent peripheral comprises a first intelligent peripheral, wherein a second intelligent peripheral of the one or more intelligent network platforms employs signaling to route the call to the first intelligent peripheral;
wherein the first intelligent peripheral plays the feedback at the calling communication device.

18. The apparatus of claim 1, wherein the intelligent peripheral plays the feedback to the calling communication device with or without connection of the call to the called communication device.

19. The apparatus of claim 1, wherein the first call leg connects the calling communication device and the intelligent peripheral, wherein the second call leg connects the intelligent peripheral and the called communication device;
wherein the intelligent peripheral delays connection of the second call leg with the called communication device to extend a duration of the feedback played at the calling communication device.

20. A method, comprising the steps of:
receiving an indication of a customized feedback selected for a calling communication device by a user of a called communication device; and
employing signaling to route a call from the calling communication device to an intelligent peripheral through a standards based mobile switching center to play the customized feedback at the calling communication device, wherein the call comprises a first call leg and a second call leg;
wherein the step of employing signaling to route the call from the calling communication device to the intelligent peripheral through the standards based mobile switching center to play the customized feedback at the calling communication device comprises the steps of:
employing signaling to connect the first call leg between the calling communication device and the intelligent peripheral;
employing signaling to connect the second call leg between the called communication device and the intelligent peripheral; and
bridging the first call leg with the second call leg to communicatively couple the calling communication device with the called communication device.

21. The method of claim 20, wherein the customized feedback comprises a ringback tone, wherein the call is intended for the called communication device, wherein the step of receiving the indication of the customized feedback selected for the calling communication device by the user of the called communication device comprises the step of:
receiving from the called communication device one or more criteria for the ringback tone to be played to the calling communication device, wherein the one or more criteria are selected by the user of the called communication device;
wherein the step of employing signaling to route the call from the calling communication device to the intelligent network platform to play the customized feedback at the calling communication device comprises the step of:
playing the ringback tone at the calling communication device upon a determination of a match between one or more characteristics of the call and one or more of the one or more criteria.

22. The method of claim 20, wherein the customized feedback comprises a ringback tone, wherein the step of employing signaling to route the call from the calling communication device to the intelligent peripheral through the standards based mobile switching center to play the customized feedback at the calling communication device comprises the steps of:
- determining that the called communication device has set up the ringback tone for the call from the calling communication device;
- indicating to the standards based mobile switching center that supports the call to route the first call leg to the intelligent network platform; and
- playing the ringback tone at the calling communication device between a receipt of the first call leg at the intelligent peripheral and an answer of the second call leg by the called communication device.

23. The method of claim 20, wherein the first call leg comprises an indication of a telephone number dialed by a user of the calling communication device;
wherein the step of employing signaling to route the call from the calling communication device to the intelligent peripheral through the standards based mobile switching center to play the customized feedback at the calling communication device comprises the steps of:
- detecting a redirection request to route calls for the telephone number to the called communication number;
- substituting a telephone number of the called communication device for the telephone number dialed by the user of the calling communication device in the second call leg; and
- bridging the first call leg with the second call leg to communicatively couple the calling communication device with the called communication device.

24. An article, comprising:
one or more computer-readable signal-bearing media;
means in the one or more media for receiving an indication of a customized feedback selected for a calling communication device by a user of a called communication device; and
means in the one or more media for employing signaling to route a call from the calling communication device to an intelligent peripheral through a standards based mobile switching center to play the customized feedback at the calling communication device, wherein the call comprises a first call leg and a second call leg;
wherein the means in the one or more media for employing signaling to route the call from the calling communication device to the intelligent peripheral through the standards based mobile switching center to play the customized feedback at the calling communication device comprises;
means in the one or more media for employing signaling to connect the first call leg between the calling communication device and the intelligent peripheral;
means in the one or more media for employing signaling to connect the second call leg between the called communication device and the intelligent peripheral; and
means in the one or more media for bridging the first call leg with the second call leg to communicatively couple the calling communication device with the called communication device.

25. An apparatus, comprising:
a called communication device that allows a user to select feedback for a calling communication device that initiates a call to the called communication device;
wherein the called communication device sends an indication of the feedback to a service control point that employs signaling to route the call from a standards based mobile switching center to an intelligent peripheral to play the feedback to the calling communication device;
wherein the called communication device is communicatively coupled with the calling communication device through the second intelligent network platform.

26. The apparatus of claim 25, wherein the feedback comprises a ringback tone to be played at the calling communication device, wherein the called communication device allows the user to select the ringback tone from a plurality of available ringback tones.

27. The apparatus of claim 26, wherein the ringback tone comprises a first ringback tone, wherein the call comprises a first call with one or more first characteristics;
wherein the called communication device allows the user to select a second ringback tone from the plurality of available ringback tones for a second call with one or more second characteristics.

28. The apparatus of claim 25, wherein the feedback comprises a ringback tone, wherein the called communication device allows the user to establish one or more ringback tone service criteria;
wherein the called communication device sends the ringback tone service criteria to the service control point, wherein the service control point compares one or more characteristics of the call to the one or more ringback tone service criteria.

29. The apparatus of claim 28, wherein if the one or more characteristics of the call match the one or more ringback tone service criteria, the service control point routes the call to the intelligent peripheral that plays the ringback tone to the calling communication device.

30. The apparatus of claim 28, wherein the one or more ringback tone service criteria comprise one or more of time of day criteria, day of week criteria, day of year criteria, and/or calling party identity criteria.

31. The apparatus of claim 28, wherein the called communication device presents an interactive voice response or wireless application protocol menu for the user to enter the one or more ringback tone service criteria.

32. The apparatus of claim 28, wherein upon receipt of a call with one or more characteristics that fail to meet the one or more ringback tone service criteria, the called communication device presents a menu that allows the user to set up one or more additional ringback tone service criteria for subsequent calls with one or more of the one or more characteristics that fail to meet the one or more ringback tone service criteria.

33. The apparatus of claim 28, wherein the called communication device sends the one or more ringback tone service criteria to the service control point to inform the service control point which incoming calls to route to the intelligent peripheral that plays the ringback tone.

34. The apparatus of claim 25, wherein the feedback comprises a first ringback tone or a second ringback tone based on one or more characteristics of the call,
wherein the called communication device allows the user to select the first ringback tone for the call from the calling communication device on normal days of year, wherein the called communication device allows the user to select a second ringback tone the call from the calling communication device on one or more special days of year.

35. The apparatus of claim 25, wherein the service control point and the intelligent peripheral comprise an integrated intelligent network platform.

36. A method, comprising the steps of:
receiving one or more user-selected ringback tone service criteria that indicate a ringback tone to play for an incoming call wit one or more characteristics; and
sending the one or more user-selected ringback tone service criteria to a service control point that, upon a determination that the one or more characteristics match the one or more user-selected ringback tone service criteria, employs signaling to route the incoming call through a standards based mobile switching center to an intelligent peripheral that plays the ringback tone to a calling party of the incoming call over a first call leg and connects the first call leg with a second call leg to a called party for the incoming call.

37. The method of claim 36, wherein the step of receiving the one or more user-selected ringback tone service criteria that indicate the ringback tone to play for the incoming call with the one or more characteristics comprises the step of:
presenting an interactive voice response or wireless application protocol menu for a user to input one or more of time of day criteria, day of week criteria, day of year criteria, and/or calling party identity criteria.

38. The method of claim 36, wherein the one or more user-selected ringback tone service criteria comprise one or more first user-selected ringback tone service criteria, wherein the ringback comprises a first ringback tone, wherein the incoming call with the one or more characteristics comprises a first incoming call with one or more first characteristics, the method further comprising the steps of:
receiving one or more second user-selected ringback tone service criteria that indicate a second ringback tone to play for a second incoming call with one or more second characteristics; and
sending the one or more second user-selected ringback tone service criteria to the service control point that, upon a determination that the one or more second characteristics match the one or more second user-selected ringback tone service criteria, employs signaling to route the second incoming call to the intelligent peripheral that plays the second ringback tone to a calling party of the second incoming call;
wherein the second ringback tone is different than the first ringback tone.

39. A method, comprising the steps of:
selecting, based on user input, a ringback tone for an incoming call with one or more user-selected characteristics;
sending an indication of the ringback tone and the one or more user-selected characteristics to a service control point;
determining that one or more characteristics of the incoming call match the one or more user-selected characteristics;
employing signaling to route the incoming call through a standards based mobile switching center to an intelligent peripheral; and
playing the ringback tone to a calling party of the incoming call over a first call leg;
connecting a second call leg through the standards based mobile switching center to a called party of the incoming call and the intelligent peripheral.

40. The method of claim 39, the method further comprising the steps of:
connecting the first call leg between the calling communication device and the intelligent peripheral to play the ringback tone to the calling communication device;
connecting the second call leg between the intelligent peripheral and the called communication device to extend the call to the called communication device; and
bridging the first call leg with the second call leg to communicatively couple the calling communication device with the called communication device.

41. The apparatus of claim 2, wherein the call drop-back command indicates two ports of the call to the switching center and instructs the switching center to bridge the two ports together;
wherein the intelligent peripheral drops out of a path of the call path and the switching center bridges the first call leg with the second call leg.

* * * * *